Figure 1:
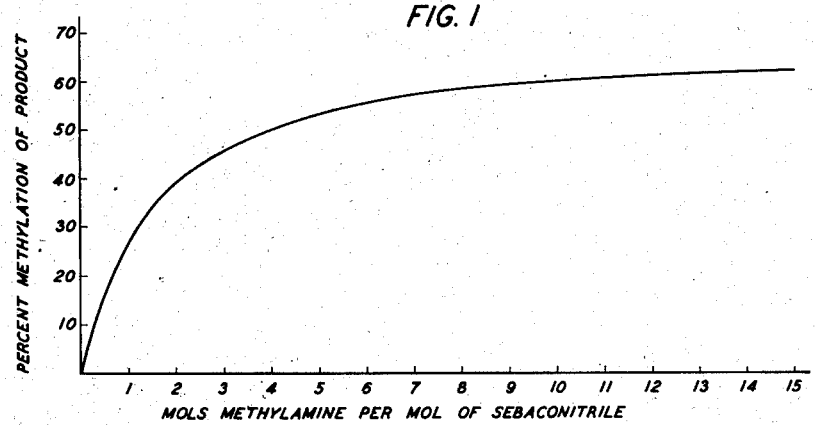

Oct. 30, 1945.    B. S. BIGGS    2,388,034
PRODUCTION OF PRIMARY AND SECONDARY AMINES

Filed Aug. 14, 1941

INVENTOR
B. S. BIGGS
BY
ATTORNEY

Patented Oct. 30, 1945

2,388,034

UNITED STATES PATENT OFFICE 2,388,034

PRODUCTION OF PRIMARY AND SECONDARY AMINES

Burnard S. Biggs, Summit, N. J., assignor to Bell Telephone Laboratories, Incorporated, New York, N. Y., a corporation of New York Application August 14, 1941, Serial No. 406,837

4 Claims. (Cl. 260—583)

This invention relates to new methods of forming secondary amines or more particularly mixtures of primary and secondary amines. The methods of this invention are particularly suited to the preparation of mixtures of primary and secondary diamines.

The method commonly used for the production of primary diamines consists of the catalytic hydrogenation of the corresponding dinitriles. This reaction is ordinarily carried out in the presence of a relatively high concentration of ammonia in order to suppress undesirable side reactions. In the absence of ammonia, the yield of diamines is low due to the formation of polyamines containing more than two amino groups and other undesired products. Typical of a common commercial process for producing diamines in this manner is the hydrogenation of adiponitrile to form hexamethylene diamine as follows:

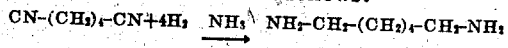

The primary diamines so produced are useful for the preparation of fiber-forming polyamides of high molecular weight by reaction with dicarboxylic acids. It has been found that similar high molecular weight polyamides having superior properties may be prepared if in place of primary diamines, diamines containing both primary and secondary amino groups in a definite ratio are used in their preparation. The desirable properties of such polyamides may be varied by a variation in the ratio of primary to secondary amino groups in the diamines.

According to the present invention, a process is provided which will furnish simply and economically a source of diamines containing both primary and secondary amino groups in an easily varied ratio.

The process of the present invention resides in the catalytic hydrogenation of a dinitrile in the presence of a primary monoamine and ammonia. The product is a mixture containing a diprimary amine, a primary-secondary amine and a disecondary amine. These three types of diamines are present in the product in the ratio:

$$A^2 : 2AB : B^2$$

respectively, where A represents the ratio of primary amino groups in the product to the total number of amino groups, and B represents the ratio of secondary amino groups in the product to the total number of amino groups. The relative proportions of primary and secondary amino groups depend upon the concentration of primary monoamine in the reaction mixture and upon the conditions of operation. The substituent on the secondary amino group is the radical attached to the amino group of the primary monoamine.

The course of the reaction involved in the process of the present invention as applied, for instance, to the production of hexamethylene diamine containing both primary and secondary amino groups, the secondary group having a methyl substituent, is illustrated by the following qualitative equation:

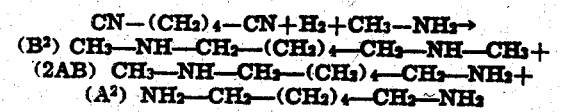

The methylamine or other primary monoamine acts to suppress the undesired side reactions in much the same manner as does ammonia. When the monoamine is present in sufficiently high concentration, considerably in excess of the theoretical amount required for reaction, extremely high yields of diamines are obtained. If, on the other hand, the dinitrile is hydrogenated in the absence of any suppressor, such as a primary monoamine or ammonia, the yield of diamines is ordinarily no more than about 50 per cent, the remainder being lost as undesired polyamines and other products.

It is ordinarily desirable that the monoamine together with ammonia be present in the reaction mixture in concentrations of about 8 mols of suppressor for each mol of dinitrile, since, with such concentrations of suppressor, yields of from 85 per cent to 90 per cent of theoretical are usually obtained. If more than 8 mols of suppressor are present, the increase in yield does not ordinarily justify the consumption of the additional suppressor. However, obviously, when the consumption of suppressor is not considered as important as higher yields, very satisfactory results may be obtained using considerably more than 8 mols of suppressor. Similarly, where low yields are not considered objectionable, the process may be carried out using very much lower concentrations of ammonia and primary amine mixtures.

Although N-substituted diamines may be formed by hydrogenating dinitriles in the absence of ammonia and the relative proportions of primary and secondary amino groups in the product may be varied by varying the concentration of monoamine in the initial reaction mixture, control of the reaction in this manner is not ordinarily desirable since, in the absence of ammonia, low yields of diamines are obtained when the concentration of monoamine is too low. In carrying out the process of the present invention the ratio of primary to secondary amino groups in the reaction product is controlled by diluting the monoamine with ammonia while maintaining the total concentration of monoamine and ammonia at a value of sufficiently high to give the desired total yield of diamines.

Figure 2:
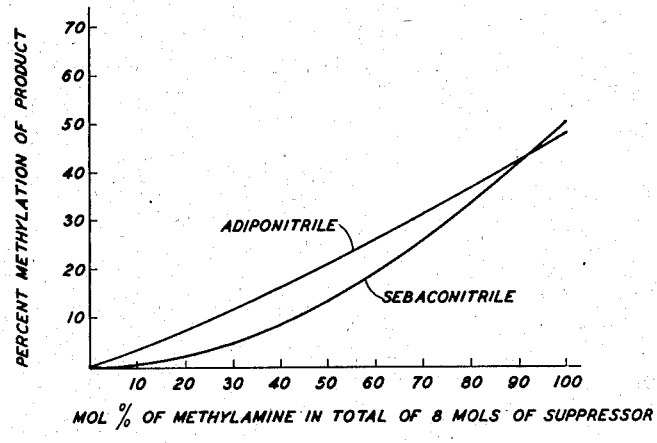

The manner in which the degree of methylation of the amino groups varies with the concentration of methylamine in the hydrogenation of dinitriles with and without ammonia as a suppressor is illustrated by the curves shown in the drawing, in which:

Fig. 1 is a curve showing the manner in which the percentage of methylation of decamethylene diamines varies with varying concentration of the methylamine, in the absence of ammonia; and Fig. 2 consists of curves showing the manner in which the percentage of methylation of the product varies with the concentration of methylamine in a reaction mixture containing sebaconitrile or adiponitrile, where the total amount of methylamine and ammonia is maintained at a value of eight mols per mol of dinitrile.

To obtain the curve shown in Fig. 1, one mol of sebaconitrile was hydrogenated in the presence of a Raney nickel catalyst under an initial pressure of about 1400 pounds per square inch and at a temperature of about 125° C. using varying amounts of methylamine. It can be seen from the curve in Fig. 1 that the percentage of methylation rises rapidly as the concentration of methylamine is increased, reaching a value of about 50 per cent secondary amino groups when the concentration of methylamine is about 8 mols per mol of sebaconitrile. Thereafter the percentage methylation increases only very slightly with increase in methylamine concentration reaching a value of only about 58 per cent at a concentration of 16 mols methylamine per mol of sebaconitrile. The degree of substitution was determined by a difference method based on a modification of the Van Slyke method for the determination of primary amino nitrogen in amino acids.

To obtain the curves shown in Fig. 2, a series of hydrogenation reactions similar to those described above in connection with Fig. 1 were carried out except that for each mol of sebaconitrile a total of eight mols of suppressor, made up of methylamine and ammonia was present in the initial reaction mixture. A similar series of reactions was carried out using adiponitrile in place of sebaconitrile. The curves show the variation in percentage of secondary amino groups in the product as the mol per cent of methylamine in the eight mols of suppressor of the original reaction mixture is varied from zero to 100 per cent. It can be seen from the curves that the percentage of methylation increases steadily from zero to about 50 per cent as the mol per cent of methylamine increases from zero to 100 per cent.

When the diamine mixtures so produced are used for the production of primary-secondary polyamides as described above, the desired degree of substitution in the amino groups of the diamine is usually less than 50 per cent. Therefore the most satisfactory practice for the production of a diamine mixture for this purpose is to carry out the reaction in a mixture of ammonia and methylamine of sufficient concentration to give the desired yield. The relative proportions of ammonia and methylamine used will depend upon the properties desired in the final polyamide.

The following specific examples will illustrate the manner in which the degree of alkylation and the yield vary with the concentration of monoamine and ammonia.

Example 1

A two liter hydrogenation bomb was charged with one mol of sebaconitrile (164 grams) and 100 cc. of alcoholic suspension of Raney nickel catalyst (containing about ten grams of nickel). The bomb was then placed in a dry-ice box to cool it to a temperature at which methylamine could be introduced in the liquid state. After several hours the bomb was removed from the box and eight mols (248 grams) of liquid methylamine was introduced. The bomb was sealed and hydrogen was admitted until the pressure in the bomb had reached 1400 pounds per square inch. The bomb was then heated and subjected to a continuous rocking. The pressure rose slowly until the temperature reached about 90° C. and then commenced to fall. The pressure at 100° C. was 1700 pounds per square inch and after one hour at 125° C. was 1000 pounds per square inch. The bomb was then cooled and the product was rinsed out with alcohol. The product was then filtered free of catalyst and distilled. The distillate boiled at 142° C. under an absolute pressure of 12 mm. of mercury. The percentage methylation was 50.2 per cent and the yield of decamethylene diamines was 162 grams or 87 per cent based on a molecular weight of 186.1.

Example 2

The procedure described in Example 1 was repeated using a reaction mixture of one mol of sebaconitrile (164 grams) and 15.5 mols of methylamine (480 grams). The product was 162 grams of decamethylene diamine mixture which had 58 per cent of its amino groups methylated. The yield was 86 per cent of the theoretical yield.

Example 3

The procedure described in Example 1 was repeated using a reaction mixture of 1 mol of sebaconitrile (164 grams) and 3.55 mols of methylamine (110 grams). The resulting decamethylene diamine mixture was 36 per cent methylated. The yield was 75.6 per cent of theoretical.

Example 4

The procedure of Example 1 was repeated using a reaction mixture of 1 mol of sebaconitrile (164 grams) 4 mols of ammonia (68 grams) and 4 mols of methylamine (124 grams). The resulting decamethylene diamine mixture was 12 per cent methylated and the yield was 86 per cent of theoretical.

Example 5

The procedure of Example 1 was repeated using 2 mols of adiponitrile (216 grams) in place of sebaconitrile and 16 mols (496 grams) of methylamine. The yield of methylated hexamethylene diamines was 202 grams or 78 per cent of theoretical. The product boiled at 92° C. under an absolute pressure of 14 mm. of mercury. The percentage methylation was 47.8 per cent.

Example 6

Two mols of adiponitrile (216 grams) were hydrogenated in the presence of a Raney nickel catalyst together with 5.35 mols of ammonia (91 grams) and 10.64 mols of methylamine (330 grams). The yield of mixed hexamethylene diamines was 185 grams. The methylation was 30.2 per cent and the yield was 74 per cent of theoretical.

Example 7

54 grams (½ mol) of adiponitrile were hydrogenated over a Raney nickel catalyst in the presence of 177 grams (3 mols) of monopropyl amine. The product consisted of 28 grams of propylated hexamethylene diamines in which 42 per cent of the amino groups were substituted.

In the above described examples, the initial cooling of the bomb was for the purpose of allowing liquid methylamine to be introduced without the application of pressure. Obviously, the step of cooling may be dispensed with when the liquid methylamine is forced into the bomb under pressure. Any other suitable hydrogenation catalyst will be found satisfactory for the reaction. The hydrogenation pressure is not critical and may be varied over an extremely wide range.

In place of methylamine, any other primary monoamine may be employed made up of an amino group joined to the radical which is desired as the amino substituent in the final product. As examples of such primary monoamines may be mentioned n-propyl amine, n-butyl amine, n-amyl amine, or cyclohexyl amine. The percentage of substitution in the final product decreases with corresponding concentration of monoamine in the initial reaction mixture as the molecular weight of the amine increases.

The primary monoamines of molecular weight higher than ethylamine are liquids at ordinary temperatures and pressures and may therefore be introduced into the hydrogenation bomb without cooling and without the application of pressure. When methylamine or ethylamine, which are gaseous at room temperatures and pressures, are employed, it is also possible to introduce them into the hydrogenation bomb without cooling and without the application of pressure if they are introduced in the form of aqueous solutions, such as a 35 per cent aqueous solution of methylamine or a 70 per cent aqueous solution of ethylamine. The total yield is about the same as that obtained with anhydrous amines but the degree of substitution is considerably lower, being usually not more than about 40 per cent.

The invention has been described in terms of its specific embodiments. Certain modifications and equivalents will be apparent to those skilled in the art. These modifications and equivalents are intended to be included within the scope of the present invention which is to be limited only by the reasonable scope of the appended claims.

What is claimed is:

1. The method of producing a mixture of decamethylene diamine, N-methyl decamethylene diamine and N, N' dimethyl decamethylene diamine, said diamines being present in the diamine mixture in such amounts that the mol fraction of diprimary amine is $A^2$, the mol fraction of primary-secondary diamine is $2AB$ and the mol fraction of disecondary diamine is $B^2$, where A is the mol fraction of primary amino groups and B is the mol fraction of secondary amino groups in the diamine mixture, which method comprises catalytically hydrogenating sebaconitrile in the liquid phase in the presence of about 8 mols of a mixture of methyl amine and ammonia per mol of sebaconitrile, both methylamine and ammonia being present in the mixture in substantial amounts.

2. The method of producing a mixture of hexamethylene diamine, N-methyl hexamethylene diamine and N, N' dimethyl hexamethylene diamine, said diamines being present in the diamine mixture in such amounts that the mol fraction of diprimary diamine is $A^2$, the mol fraction of primary-secondary diamine is $2AB$ and the mol fraction of disecondary diamine is $B^2$, where A is the mol fraction of primary amino groups and B is the mol fraction of secondary amino groups in the diamine mixture, which method comprises catalytically hydrogenating adiponitrile in the liquid phase in the presence of about 8 mols of a mixture of methyl amine and ammonia per mol of adiponitrile, both methylamine and ammonia being present in the mixture in substantial amounts.

3. The method of producing a mixture of polymethylene diamine, N-alkyl polymethylene diamine and N,N' dialkyl polymethylene diamine, said diamines being present in the diamine mixture in such amounts that the mol fraction of diprimary amine is $A^2$, the mol fraction of primary-secondary diamine is $2AB$ and the mol fraction of disecondary diamine is $B^2$, where A is the mol fraction of primary amino groups and B is the mol fraction of secondary amino groups in the diamine mixture, which method comprises catalytically hydrogenating a polymethylene dicyanide selected from the group consisting of sebaconitrile and adiponitrile in the liquid phase in the presence of about 8 mols, per mol of nitrile, of a mixture of ammonia and a monoalkyl monoamine containing not more than 6 carbon atoms, both ammonia and monoalkyl monoamine being present in the mixture in substantial amounts.

4. The method described in claim 3 wherein the monoalkyl monoamine is methylamine.

BURNARD S. BIGGS.